(12) United States Patent
Choi

(10) Patent No.: US 9,137,553 B2
(45) Date of Patent: Sep. 15, 2015

(54) CONTENT SERVER AND CONTENT PROVIDING METHOD OF THE SAME

(71) Applicant: Samsung Electronics Co., Ltd., Suwon-si (KR)

(72) Inventor: Jeong-il Choi, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 4 days.

(21) Appl. No.: 14/178,841

(22) Filed: Feb. 12, 2014

(65) Prior Publication Data

US 2014/0232934 A1 Aug. 21, 2014

(30) Foreign Application Priority Data

Feb. 15, 2013 (KR) ........................ 10-2013-0016293

(51) Int. Cl.
*H04N 21/2343* (2011.01)
*H04N 19/40* (2014.01)

(52) U.S. Cl.
CPC ........ *H04N 21/234309* (2013.01); *H04N 19/40* (2014.11)

(58) Field of Classification Search
None
See application file for complete search history.

(56) References Cited

U.S. PATENT DOCUMENTS

2010/0088292 A1* 4/2010 Tirpak et al. .................. 707/705
2012/0082150 A1* 4/2012 Ozawa .......................... 370/338

FOREIGN PATENT DOCUMENTS

KR 10-2013-0038192 A 4/2013

* cited by examiner

*Primary Examiner* — Nathan Flynn
*Assistant Examiner* — Omar S Parra
(74) *Attorney, Agent, or Firm* — Sughrue Mion, PLLC

(57) ABSTRACT

A content server and a content providing method of the same, and more particularly, a content server and a content providing method of the same which transcodes content and transmits and receives the transcoded content. The content server communicates with at least one external device which includes a storage part which stores a content therein; and a controller which, upon receiving a request from a content receiver for a predetermined content and information on a content format that is supportable by the content receiver, searches the storage part and the at least one external device for the predetermined content transcoded into the content format, and if such content is found, receives the predetermined content transcoded into the content format and provides the content receiver with the predetermined content transcoded into the content format.

17 Claims, 4 Drawing Sheets

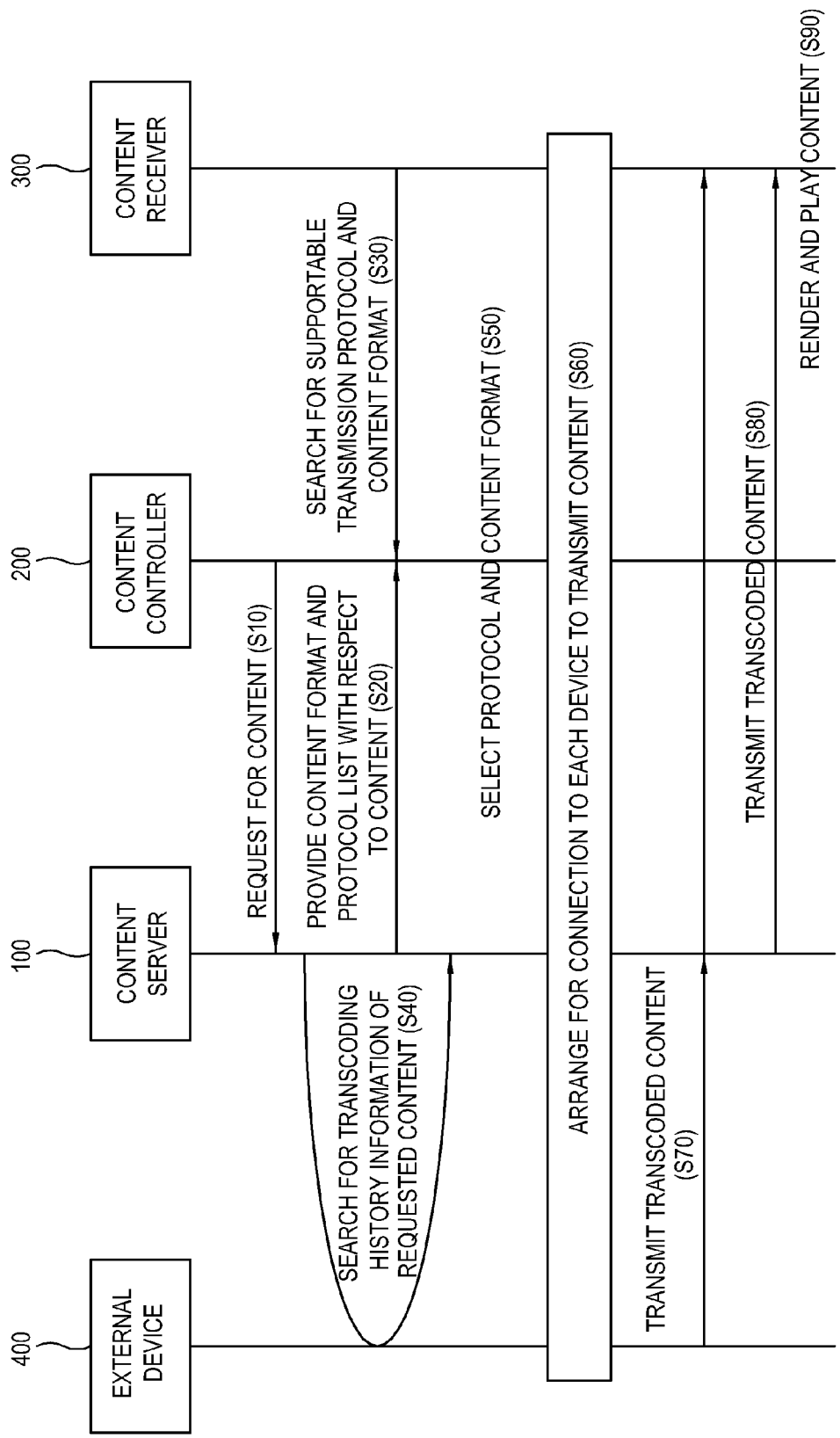

FIG. 4

| CONTENT | | | Options |
|---|---|---|---|
| General | Video | Audio | Specific obj |
| ID<br>Compression name<br>Format<br>File Size<br>Duration<br>Overall bit rate | ID<br>Menu ID<br>Format<br>Format version<br>Format profile<br>Format settings, Matrix<br>Duration<br>Bit rate mode<br>Bit rate<br>Normal Bit rate<br>Width<br>Height<br>Display aspect rate<br>Frame rate<br>Colormetry<br>Scan type<br>Bits(Pixel·Frame)<br>Stream size | ID<br>Menu ID<br>Format<br>Format/Info<br>Duration<br>Bit rate mode<br>Bit rate<br>Channel(s)<br>Channel positions<br>Sampling rate<br>Stream size | ID<br>Matching ID<br>Specific ID<br>Transcoded info Num<br>ORG ID<br>Method<br>Reserved info |

CONTENT SERVER AND CONTENT PROVIDING METHOD OF THE SAME

CROSS-REFERENCE TO RELATED APPLICATION

This application claims priority from Korean Patent Application No. 10-2013-0016293, filed on Feb. 15, 2013 in the Korean Intellectual Property Office, the disclosure of which is incorporated herein by reference in its entirety.

BACKGROUND

1. Field

Apparatuses and methods consistent with the exemplary embodiments relate to providing a content server and a content providing method of the same, and more particularly, to providing a content server and a content providing method of the same which transcodes content, and transmits and receives the transcoded content.

2. Description of the Related Art

With the increase in the use of various multimedia devices such as mobile phones, smart phones, MP3 players, portable media players (PMPs), Home Manager, netbooks, and tablet personal computers (PCs), multimedia contents with various codecs are being increasingly shared. In recent years, multimedia files have become larger with the advent of high definition (HD) broadcasting. Unlike televisions (TVs) which have large HD screens, mobile devices have small displays. Accordingly, mobile devices convert the codec of various contents in a network, consistent with the environment of the mobile device, or transcode the various contents, including a resizing of an image, such as resolution, to transmit the various contents.

To meet the aforementioned requirements, original multimedia sources may be converted by a media server, home gateway, or a module supporting the transcoding function, within a particular home network service connecting the media server, the home gateway, or others. In the related art, transcoding technology is being improved to provide a content consistent with the respective requirements of the various multimedia devices.

In the case of Digital Living Network Alliance (DLNA) technology supporting home networking services, various contents are exchanged by one-to-one communication between a device requesting a content and a device providing the content in response to the request. Such a configuration is directly or indirectly affected by limitations of the devices, such as CPU performance, operating system (OS), bandwidth between networks, etc., which may cause delay in providing the contents. If the devices fail to exchange the contents due to such limitations, they must retry the exchange of contents, which causes inconvenience.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a content server and a content providing method of the same which provides a content stream through a plurality of paths.

Another exemplary embodiment provides a content server and a content providing method of the same which provides a content that is promptly transcoded.

Still another exemplary embodiment provides a content server and a content providing method of the same which, even if transmission of a content is failed through a path, provides the content through another path since it uses a plurality of paths.

Still another exemplary embodiment provides a content server and a content providing method of the same which generates transcoding history information for a quick content search.

According to an aspect of an exemplary embodiment, there is provided a content server, configured to communicate with at least one external device, including: a storage part configured to store a content therein; and a controller configured to, upon receiving a request from a content receiver for a predetermined content and information on a content format that is supportable by the content receiver, search the storage part and the at least one external device for the predetermined content transcoded into the content format, and if such content is found, receive the predetermined content transcoded into the content format and provide the content receiver with the predetermined content transcoded into the content format.

Wherein if the predetermined content transcoded into the content format is found in a plurality of external devices, the controller is configured to divide the predetermined content transcoded into the content format stored in the plurality of external devices into a plurality of parts, and receive the plurality of parts of the predetermined content transcoded into the content format from the plurality of external devices.

Wherein the predetermined content transcoded into the content format stored in the external device may include history information including at least one of content identification, transcoding information, information on the transcoded frequency, external device information, and reserved information.

Wherein the controller is configured to search for the predetermined content transcoded into the content format by using the history information.

The content server may further include a transcoding part configured to transcode a content, wherein if the predetermined content transcoded into the content format is not found, the controller is configured to control the transcoding part to transcode the requested content into the content format, generate transcoding history information after transcoding the requested content, and provide the content receiver with the generated history information.

Wherein the history information may include at least one of content identification, transcoding information, transcoding number information, external device information, and reserved information.

Wherein the transcoding part is configured to resize the requested content by changing a codec and resolution of the content and rescaling the content, and encode the content in a manner such that the content is decodable by the content receiver.

According to an aspect of another exemplary embodiment, there is provided a content providing method of a content server which includes a storage part configured to store a content therein, and communicate with at least one external device, the method including: receiving a request from a content receiver for a predetermined content and information on a content format that is supportable by the content receiver; searching at least one of the storage part and the at least one external device for the predetermined content transcoded into the content format; and receiving the predetermined content transcoded into the content format and providing the content receiver with the predetermined content transcoded into the content format, if the predetermined content transcoded into the content format is found.

The method may further include dividing the predetermined content transcoded in the content format stored in a plurality of external devices into a plurality of parts and receiving the plurality of parts of the predetermined content transcoded in the content format from the plurality of external devices, if the predetermined content transcoded in the content format is found in a plurality of the external devices.

Wherein the predetermined content transcoded into the content format stored in the at least one external device may include history information including at least one of content identification, transcoding information, transcoding number information, external device information, and reserved information, and the searching for the predetermined content transcoded into the content format may include searching using the history information.

The method may further include: transcoding the requested predetermined content into the content format if no transcoded content is found; and generating transcoding history information after transcoding the requested predetermined content and providing the generated history information to the content receiver.

Wherein the history information may include at least one of content identification, transcoding information, transcoding number information, external device information, and reserved information.

Wherein the transcoding the requested predetermined content into the content format may include resizing the requested predetermined content by changing at least one of a codec and resolution of the content and rescaling of the content, and encoding the requested content to be decoded by the content receiver.

According to an aspect of another exemplary embodiment, there is provided a method of providing transcoded content to a content receiver including: receiving a request for the transcoded content in a format supported by the content receiver; searching for the requested transcoded content; and providing the requested transcoded content to the content receiver.

Wherein the searching may include: searching a content server for the requested transcoded content; and searching at least one of a plurality of external devices for the requested transcoded content.

Wherein the providing may further include: if the requested transcoded content is found on the content server, transmitting the requested transcoded content to the content receiver; if the requested transcoded content is found on at least one of the plurality of external device, transmitting the requested transcoded content to the content receiver; and if the requested transcoded content is not found on the content server or at least one of the plurality of external devices, transcoding a content into the format supported by the content receiver and transmitting the content to the content receiver.

The method may further include providing a content list to the content receiver, wherein the content list may include a plurality of contents that can be requested by the content receiver.

Wherein if the requested transcoded content is found on a plurality of the external devices, receiving a portion of the requested transcoded content from each of the plurality of the external devices.

The method may further include generating transcoding history information for identifying stored transcoded content.

Wherein the transcoded history information may include at least one of content identification, transcoding information, transcoding number information, external device information, and reserved information.

Wherein the transcoding the content into the format supported by the content receiver may include resizing the content by changing a codec and resolution of the content and rescaling the content.

Wherein the content server, the plurality of external devices, and the content server may be connected in a network supported by digital living network alliance technology.

BRIEF DESCRIPTION OF THE DRAWINGS

The above and/or other aspects will become apparent by describing certain exemplary embodiments with reference to the accompanying drawings, in which:

FIG. 3 is a control flowchart illustrating a content providing method according to an exemplary embodiment; and FIG. 4 is a block diagram illustrating a content and its transcoding history information according to an exemplary embodiment.

DETAILED DESCRIPTION OF EXEMPLARY EMBODIMENTS

Figure 1:
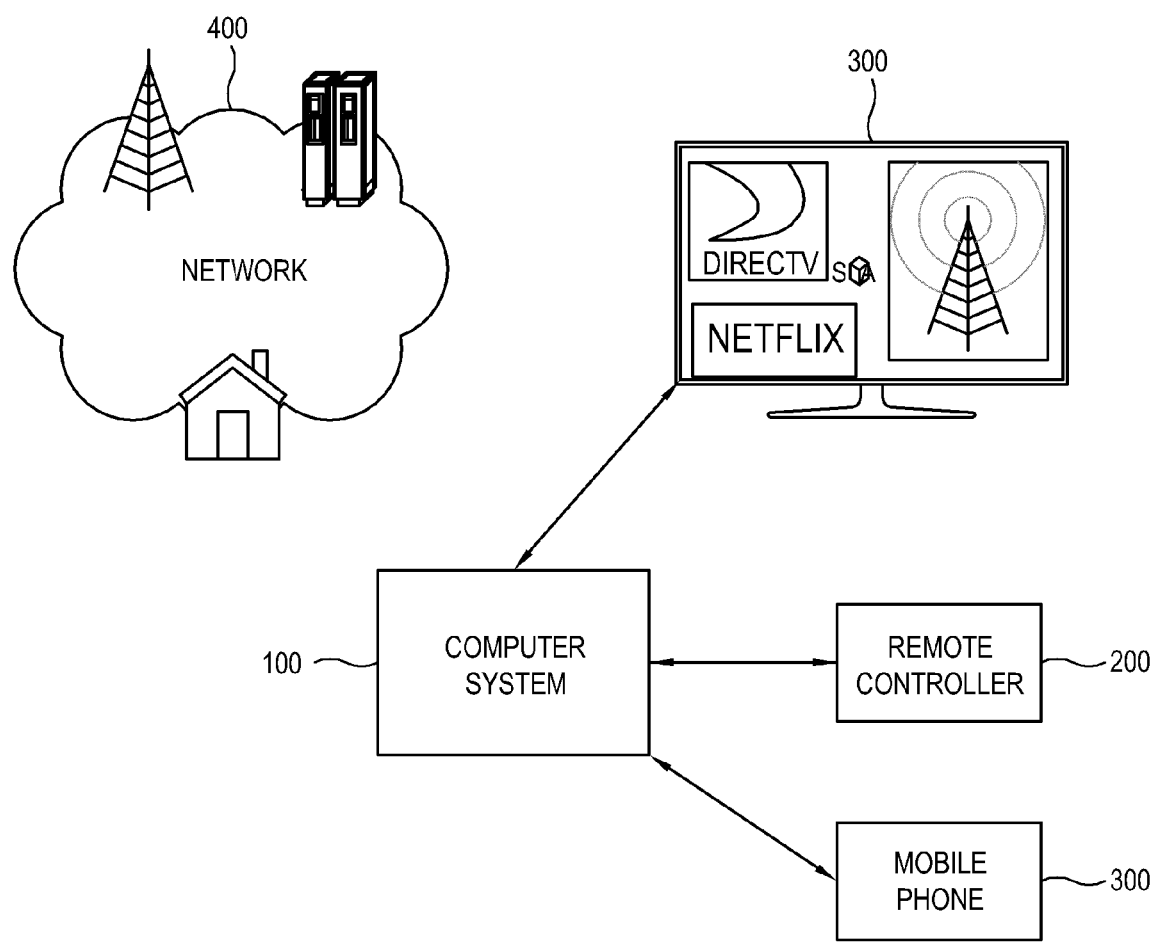
FIG. 1 is a perspective view illustrating a content providing system according to an exemplary embodiment.

Certain exemplary embodiments will be described in detail with reference to accompanying drawings.

In the following description, like drawing reference numerals are used for the same elements, even in different drawings. The following description and the attached drawings are provided for a better understanding of the exemplary embodiments, and the exemplary embodiments may be embodied in various forms without being limited to the exemplary embodiments set forth herein. Well-known functions or constructions are not described in detail since that would obscure the exemplary embodiments with unnecessary details.

FIG. 1 is a perspective view of a content providing system according to an exemplary embodiment. As shown therein, a content server 100, according to the present exemplary embodiment, may be implemented as a computer system which provides a content to other devices in the communication environment supporting home networking service.

Middleware, which supports home networking for sharing a digital content such as music, photos, and video stored in home electronic devices such as computers, home appliances, and mobile phones, includes Universal Plug and Play (UPnP), Home Audio Video Interoperability (HaVi), Jini, Video Electronics Standard Association (VESA), DLNA, etc. According to the present exemplary embodiment, the content server 100, a content controller 200, and a content receiver 300 may communicate with one another via DLNA established on the basis of an industrial standard such as HTTP, UPnP, and Wi-Fi. DLNA focuses on sharing all contents provided by TVs, VCRs, digital cameras, audio systems, etc., and supports acquisition, transmission, and management of many digital media contents (e.g., photos, music, video, etc.) from personal devices such as mobile devices and PCs. The DLNA configuration is divided into a digital media server (DMS), a digital media player (DMP), and a digital media render (DMR), depending on their respective roles. Among the aforementioned configurations, the module acting as the control point instructs devices, including the DMS, DMP, and DMR, to play media, and exchanges control signals.

As a device owning contents that may be shared in practice, the content server 100 acts as the DMS storing a content, and upon connection of the DMP and DMR to the network, distributes and transmits its contents to be used by other devices.

The content receiver 300 may include any device, such as TV or mobile phone, which may render and play media files, such as video and audio files. The content receiver 300 may include a media player, such as a TV, a mobile phone, or a game console, which may select and play a content from a content list provided by the content server 100, and a media renderer, such as a TV, an audio/video receiver, and a speaker, which is connected to the media server through the content controller 200 and plays the content provided by the content server 100.

The content controller 200 searches for the content receiver 300, which may search for and execute the content list provided by the content server 100, connects the searched content receiver 300 to the content server 100, and controls exchange of the content. If the content receiver 300 is implemented by a device, such as a mobile phone or a tablet PC, that directly communicates with the content server 100, the content controller 200 may be excluded from the content providing system since the functionality of the content controller 200 may be integrated into the content receiver 300 rather than being provided separately. However, if a device, such as a monitor or a TV which simply receives and renders images, acts as the content receiver 300, an intelligent remote controller, which may control the monitor or TV and communicate with the content server 100, may act as the content controller 200.

Upon receiving a request for a content, the content server 100 performs a transcoding process for changing and adjusting the format of the content so that the content may be played by the content receiver 300. The transcoding process may be performed by a device including a content transcoding module, and thus is not limited to being performed only by the content server 100. The content server 100 may simply provide a source of the content, and the content server 300, which may perform the transcoding process, may transcode and play the content. However, due to the limitations on the size of the screen displaying an image and the codec, the content receiver 300 typically receives the transcoded content through the content server 100. As an example, in the present exemplary embodiment, the content server 100 may provide the transcoded content to the content receiver 300.

According to the present exemplary embodiment, upon receiving a request for a content, the content server 100 searches for a content stored in an external device 400 connected to the content server 100 through a network and if the content is found, provides the searched content to the content receiver 300 rather than providing the content by the content server 100 to the content receiver 300. If the transcoded content is found in at least one of the content server 100 and the external device 400, the content server 100 may provide the searched content to the content receiver 300 via a plurality of paths.

Figure 2:
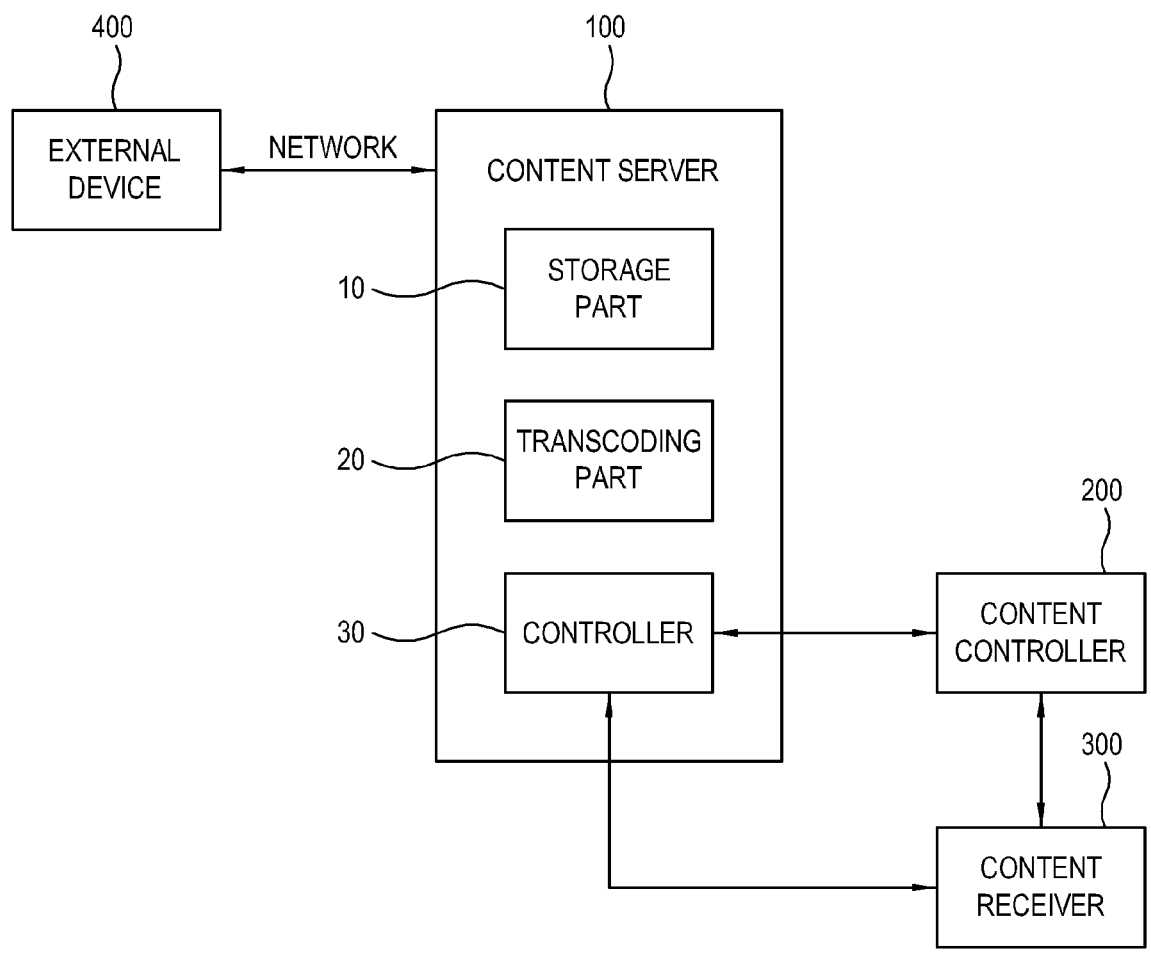
FIG. 2 is a control block diagram illustrating a content server and a content receiver according to an exemplary embodiment.

FIG. 2 is a control block diagram of the content server 100 and content receiver according to an exemplary embodiment. As shown therein, the content server 100 and the external device 400 are connected to, and communicate with, each other through a network and exchange various control signals and contents. The external device 400 may include any device other than the content receiver 300 which makes a request for the content. For example, the external device 400 may be implemented as another content receiver connected through home networking and providing content, or as a TV at a neighbor's home, or a cloud in the Internet. A large server which stores a content transcoded in various formats may also act as the external device 400. The external device 400 and the content server 100 may recognize and access each other based on a particular protocol.

The content server 100 is connected to the content controller 200 and the content receiver 300 through home networking. The content server 100 includes a storage part 100 for storing a content therein, a transcoding part 20 changing a format of content, and a controller 30 controlling the foregoing elements. The content server 100, the content controller 200, and the content receiver 300 may include a communication part (not shown) to exchange images, user interface information, and various control signals through networking based on DLNA.

The storage part 100 may store therein a content, and store a transcoded content to be played by a particular content receiver 300. The content server 100 may also search for a content from the external device 400 through a network and provide the searched content to the content receiver 300.

The transcoding part 20 transcodes the content into a format that is supportable by the content receiver 300. The transcoding part 20 resizes the content, i.e., changes the codec and resolution of the content and rescales the content, and encodes the content to be decoded by the content receiver 300. Furthermore, the transcoding part 20 decompresses and compresses the content, changes the codec of the content to a codec that is supported by the content receiver 300, or edits the content. The rescaling process of the transcoding part 20 is accompanied with conversion of the frame rate of the content, interlacing of the content, and progressive conversion of the content.

Upon receiving a request from the content receiver 300 for a predetermined content and information on the content format supportable by the content receiver 300, the controller 30 searches the storage part 100 and the external device 400 for a content transcoded in the received content format. If the searched content is found, the controller receives and transmits the searched content to the content receiver 300.

FIG. 3 is a control flowchart showing a content providing method according to an exemplary embodiment.

The content server 100 distributes a content list. The controller 30 of the content server 100 receives a request for a predetermined content to be played by the content receiver 300, through the content controller 200 (S10). In the present exemplary embodiment, the content provided by the content server 100 is transmitted to the content receiver 300 through the content controller 200, and the connection of the content server 100 and the content receiver 300 is controlled by the content controller 200. In another exemplary embodiment, the content receiver 300 may directly communicate with, and receive a content from, the content server 100.

Upon receiving a request for a content, the controller 30 provides the content controller 200 with a format of the requested content and a transmission protocol (S20), and the content controller 200 searches for a transmission protocol and content format that is supportable by the content receiver 300 (S30). That is, the content controller 200 collects information from the content server 100 and the content receiver 300 to match a content that may be provided by the content server 100 and a content that is playable by the content receiver 300.

Then the content controller 200 selects the transmission protocol and the content format to transmit the content, and arranges for the transmission of the content (S40).

Upon receiving the request for a content, the content server 100 searches for the content from the storage part 100 and the external device 400 that is connected through the network (S50). The content server 100 may search for a content transcoded into the content format supported by the content receiver 300, and if the transcoded content is found, may receive the transcoded content.

The content which is stored in the external device 400 and the storage part 100 may be stored together with transcoding history information. The transcoding history information may include at least one of content identification (ID), transcoding information, transcoding number information, external device information, and reserved information regarding a particular content.

FIG. 4 is a block diagram of a content and transcoding history information thereof according to an exemplary embodiment. As shown therein, the content according to the present exemplary embodiment includes information on a plurality of items for identifying the content and indexing the configuration of the content, and further includes an item for the transcoding history information. The item includes various information including the size and bit rate of the content, and video and audio information. The transcoding history information refers to information on the transcoding process of the content, and includes e.g., ID of history information, codec, a matching ID of the transcoding, transcoded info num, and reserved info. The controller 30 uses a particular protocol and searches only the transcoding history information and thus may find the content transcoded into a desired format. That is, the content server 100 has a particular protocol, that has been agreed on in advance with the external device 400, to search for the history information through the protocol, and based on such protocol, the transcoding history information is generated. The transcoding history information includes information about the content transcoded into a format supportable by a particular device, the number of transcoding, storage format, and devices through which the content is uploaded and downloaded. Therefore, the controller 30 may search only for the transcoding history information and easily find a desired content.

If no content transcoded into the content format supported by the content receiver 300 is found in the storage part 100 and the external device 400, the controller 30 controls the transcoding part 20 to transcode the requested content. The controller 30 may generate transcoding history information after transcoding the content, and provide the generated transcoding history information together with the content, to the content receiver 300. If the content is uploaded from the content receiver 300 to another content receiver 300, the transcoding history information includes all of the uploading information. That is, the transcoding history information includes the process of supplying the content to any device from the time when the content is transcoded. The information is used by the controller 30 to search for the transcoded content, and is controlled by the controller 30.

If the transcoded content is found, the controller 30 attempts to connect to the external device 400 to receive the content therefrom.

According to a control of the content controller 200, the controller 30 is connected to the content receiver 300 and arranges for connection to each external device 400 to transmit the content (S60).

If the connection is arranged for, the controller 30 receives the transcoded content from the external device 400 (S70), and transmits the content to the content receiver 300. If any content is stored in the storage part 100, the content is transmitted to the content receiver 300 (S80). The content is divided into packets and transmitted to the content receiver 300.

If the transcoded content is transmitted to the content receiver 300, the content receiver 300 renders or plays the content for a user (S90).

The controller 30 may receive the content from a plurality of external devices 400, in which case the content may be divided into a plurality of parts and only the content corresponding to a particular part may be transmitted by the respective external devices 400 to the controller 30. That is, the controller 30 may concurrently receive the transcoded content through a plurality of paths. Unlike the existing one-to-one transmission of the content between devices, the content according to the present exemplary embodiment may be concurrently provided by the plurality of external devices 400 storing the transcoded content. Considering the communication method and distance from the external devices 400, the size of the content, and the transmission rate of the content, the controller 30 may control the quantity of the content to be provided to the controller 30, and when the content is transmitted through a plurality of paths, continuously monitor the paths to prevent any interference or error. The content divided and transmitted into a plurality of parts is transmitted to the content receiver 300 sequentially or according to a series of principles. If the content is searched and provided through the plurality of paths as above, the content may be provided promptly, and even if a path has a problem, the content may be transmitted through another path and thus efficiency is enhanced in providing the content.

Of course, if the content is located in a single external device 400, it is transmitted to the content receiver 300 through a single path.

As described above, according to an exemplary embodiment, a content server and a content providing method of the same may provide a content stream through a plurality of paths.

Also, according to an exemplary embodiment, the content server and the content providing method of the same may provide a content that is promptly transcoded.

Also, according to an exemplary embodiment, the content server and the content providing method of the same may use a plurality of paths in providing a content, and thus, even if transmission of the content through a path is failed, may use another path in providing the content.

Also, according to an exemplary embodiment the content server and the content providing method of the same may generate transcoding history information to search for a content promptly.

While certain exemplary embodiments have been particularly shown and described, it will be appreciated by those skilled in the art that various changes in form and details may be made therein without departing from the principles and spirit of the inventive concept as defined by the appended claims and their equivalents.

What is claimed is:

1. A content server, configured to communicate with at least one external device, comprising:
 a storage part configured to store a content therein; and
 a controller configured to, upon receiving a request from a content receiver for a predetermined content and information on a content format that is supportable by the content receiver, search the storage part and the at least one external device for the predetermined content transcoded into the content format, and if such content is found, receive the predetermined content transcoded into the content format and provide the content receiver with the predetermined content transcoded into the content format,
wherein if the predetermined content transcoded into the content format is found in a plurality of external devices, the controller is configured to divide the predetermined content transcoded into the content format stored in the plurality of external devices into a plurality of parts, and receive the plurality of parts of the predetermined content transcoded into the content format from the plurality of external devices.

2. The content server according to claim 1, wherein the predetermined content transcoded into the content format stored in the external device comprises history information comprising at least one of content identification, transcoding information, information on the transcoded frequency, external device information, and reserved information, and
wherein the controller is configured to search for the predetermined content transcoded into the content format by using the history information.

3. The content server according to claim 1, further comprising a transcoding part configured to transcode a content, wherein
if the predetermined content transcoded into the content format is not found, the controller is configured to control the transcoding part to transcode the requested content into the content format, generate transcoding history information after transcoding the requested content, and provide the content receiver with the generated history information.

4. The content server according to claim 3, wherein the history information comprises at least one of content identification, transcoding information, transcoding number information, external device information, and reserved information.

5. The content server according to claim 3, wherein the transcoding part is configured to resize the requested content by changing a codec and resolution of the content and rescaling the content, and encode the content in a manner such that the content is decodable by the content receiver.

6. A content providing method of a content server which comprises a storage part configured to store a content therein, and communicate with at least one external device, the method comprising:
receiving a request from a content receiver for a predetermined content and information on a content format that is supportable by the content receiver;
searching at least one of the storage part and the at least one external device for the predetermined content transcoded into the content format; and
receiving the predetermined content transcoded into the content format and providing the content receiver with the predetermined content transcoded into the content format, if the predetermined content transcoded into the content format is found,
wherein the receiving the predetermined content comprises dividing the predetermined content transcoded in the content format stored in a plurality of external devices into a plurality of parts and receiving the plurality of parts of the predetermined content transcoded in the content format from the plurality of external devices, if the predetermined content transcoded in the content format is found in a plurality of the external devices.

7. The method according to claim 6, wherein the predetermined content transcoded into the content format stored in the at least one external device comprises history information comprising at least one of content identification, transcoding information, transcoding number information, external device information, and reserved information, and the searching for the predetermined content transcoded into the content format comprises searching using the history information.

8. The method according to claim 6, further comprising:
transcoding the requested predetermined content into the content format if no transcoded content is found; and
generating transcoding history information after transcoding the requested predetermined content and providing the generated history information to the content receiver.

9. The method according to claim 8, wherein the history information comprises at least one of content identification, transcoding information, transcoding number information, external device information, and reserved information.

10. The method according to claim 8, wherein the transcoding the requested predetermined content into the content format comprises resizing the requested predetermined content by changing at least one of a codec and resolution of the content and rescaling of the content, and encoding the requested content to be decoded by the content receiver.

11. A method of providing transcoded content to a content receiver comprising:
receiving a request for the transcoded content in a format supported by the content receiver;
searching a plurality of external devices for the requested transcoded content;
if the requested transcoded content is found in at least two of the plurality of external devices, receiving a portion of the requested transcoded content from each of the at least two external devices; and
providing the requested transcoded content to the content receiver.

12. The method of claim 11, wherein the searching further comprises:
searching a content server for the requested transcoded content.

13. The method of claim 12, wherein the providing further comprises:
if the requested transcoded content is found on the content server, transmitting the requested transcoded content to the content receiver;
if the requested transcoded content is found on at least one of the plurality of external devices, transmitting the requested transcoded content to the content receiver; and
if the requested transcoded content is not found on the content server or at least one of the plurality of external devices, transcoding a content into the format supported by the content receiver and transmitting the content to the content receiver.

14. The method of claim 13, wherein the transcoding the content into the format supported by the content receiver comprises resizing the content by changing a codec and resolution of the content and rescaling the content.

15. The method of claim 12, wherein the content server, the plurality of external devices, and the content receiver are connected in a network.

16. The method of claim 11, further comprising:
providing a content list to the content receiver, wherein the content list comprises a plurality of contents that can be requested by the content receiver.

17. The method of claim 11, further comprising generating transcoding history information for identifying stored transcoded content,
wherein the transcoded history information comprises at least one of content identification, transcoding information, transcoding number information, external device information, and reserved information.

* * * * *